United States Patent
Huang et al.

(10) Patent No.: US 11,216,976 B2
(45) Date of Patent: Jan. 4, 2022

(54) ANGLE OF VIEW CALIBRATION METHOD, VIRTUAL REALITY DISPLAY SYSTEM AND COMPUTING APPARATUS

(71) Applicant: Acer Incorporated, New Taipei (TW)

(72) Inventors: Chih-Wen Huang, New Taipei (TW); Chao-Kuang Yang, New Taipei (TW); Wen-Cheng Hsu, New Taipei (TW)

(73) Assignee: Acer Incorporated, New Taipei (TW)

( * ) Notice: Subject to any disclaimer, the term of this patent is extended or adjusted under 35 U.S.C. 154(b) by 162 days.

(21) Appl. No.: 16/595,480

(22) Filed: Oct. 8, 2019

(65) Prior Publication Data

US 2021/0019913 A1 Jan. 21, 2021

(30) Foreign Application Priority Data

Jul. 19, 2019 (TW) ................. 108125598

(51) Int. Cl.
| | | |
|---|---|---|
| *H04N 5/225* | (2006.01) | |
| *G06T 7/80* | (2017.01) | |
| *G06T 7/70* | (2017.01) | |
| *G06T 19/00* | (2011.01) | |
| *G06F 3/01* | (2006.01) | |
| *G06N 20/00* | (2019.01) | |
| *G02B 27/01* | (2006.01) | |

(52) U.S. Cl.
CPC ............ *G06T 7/80* (2017.01); *G02B 27/0172* (2013.01); *G06F 3/011* (2013.01); *G06F 3/017* (2013.01); *G06N 20/00* (2019.01); *G06T 7/70* (2017.01); *G06T 19/006* (2013.01); *G02B 2027/0138* (2013.01)

(58) Field of Classification Search
CPC .............. G06T 7/80; G06T 7/70; G06F 3/011
USPC ..................................................... 348/207.99
See application file for complete search history.

(56) References Cited

U.S. PATENT DOCUMENTS

| | | | |
|---|---|---|---|
| 2008/0030429 A1* | 2/2008 | Hailpern ............... | A63F 13/213 345/8 |
| 2015/0253574 A1* | 9/2015 | Thurber ............. | G02B 27/0172 359/630 |
| 2016/0239080 A1* | 8/2016 | Marcolina ............... | G06F 1/163 |
| 2018/0095636 A1* | 4/2018 | Valdivia ............... | G06F 3/04815 |
| 2018/0174365 A1* | 6/2018 | Cancel Olmo .... | H04N 5/23296 |

\* cited by examiner

*Primary Examiner* — Usman A Khan
(74) *Attorney, Agent, or Firm* — JCIPRNET (57) ABSTRACT

An angle of view calibration method, a virtual reality display system and a computing apparatus are provided. Whether a Head-Mounted-Display (HMD) is worn on the head of a user is detected by a wearing sensor. A current video frame displayed by the HMD is captured in response to the HMD being worn on the head of the user, wherein the current video frame is generated based on an orientation position parameter of the HMD. A frame elevation angle of the current video frame is determined. The orientation position parameter of the HMD is calibrated according to the frame elevation angle, such that the HMD displays a next video frame generated based on the calibrated orientation position parameter.

7 Claims, 5 Drawing Sheets

FIG. 5

ANGLE OF VIEW CALIBRATION METHOD, VIRTUAL REALITY DISPLAY SYSTEM AND COMPUTING APPARATUS

CROSS-REFERENCE TO RELATED APPLICATION

This application claims the priority benefit of Taiwan application serial no. 108125598, filed on Jul. 19, 2019. The entirety of the above-mentioned patent application is hereby incorporated by reference herein and made a part of this specification.

BACKGROUND

1. Field of the Invention

The present disclosure relates to a virtual reality technology and in particular relates to an angle of view (AOV) calibration method, a virtual reality display system and a computing apparatus.

2. Description of Related Art

In recent years, a virtual reality (VR) display technology has developed fierily. A VR display generates a virtual world of a three-dimensional space by utilizing computer simulation, provides a user simulation with regard to visual sense and makes the user feel as if he/she is personally on the scene. Generally speaking, the VR display may be implemented as a Head-Mounted-Display (HMD). The user may observe matters in the three-dimensional space without limits in time by using the VR display. When the user acts, a computer is capable of immediately performing complex computation and returning a precise three-dimensional world image to the VR display, so that the user is enabled to feel presence.

However, when the user wears the VR display to watch a virtual reality content, a frame angle of view provided by the VR display may be inconsistent with a watching angle of view expected by the user, and therefore, the experience of the user is affected. For example, the frame angle of view displayed by the VR display may be not a horizontal image content due to position errors or other relevant factors when the head of the user is upright and the user horizontally faces to the front. Or, when the user desires to use the VR display in a lying posture, the VR display is incapable of immediately displaying a frame corresponding to a horizontal angle of view, and the user generally needs to regulate the displayed frame by executing an additional calibration step.

SUMMARY

Accordingly, the present disclosure provides an angle of view calibration method, a virtual reality display system and a computing apparatus, which are capable of automatically calibrating a frame angle of view of a VR display to form a specific angle of view (such as a horizontal angle of view) expected by a user, so that the use convenience is improved.

An embodiment of the present disclosure provides an angle of view calibration method, which is suitable for a virtual reality display system including an HMD, and the method includes the following steps: detecting whether the HMD is worn on the head of a user by utilizing a wearing sensor; capturing a current video frame displayed by the HMD in response to the HMD being worn on the head of the user, where the current video frame is generated based on an orientation position parameter of the HMD; determining a frame elevation angle of the current video frame; and calibrating the orientation position parameter of the HMD according to the frame elevation angle, such that the HMD displays a next video frame generated based on the calibrated orientation position parameter.

An embodiment of the present disclosure provides a virtual reality display system including an HMD and a computing apparatus. The HMD includes a wearing sensor. The wearing sensor detects whether the HMD is worn on the head of a user. The computing apparatus includes a storage circuit and a processor coupled to the storage circuit. The processor is configured to execute the following steps: capturing a current video frame displayed by the HMD in response to the HMD being worn on the head of the user, where the current video frame is generated based on an orientation position parameter of the HMD; determining a frame elevation angle of the current video frame; and calibrating the orientation position parameter of the HMD according to the frame elevation angle, such that the HMD displays a next video frame generated based on the calibrated orientation position parameter.

An embodiment of the present disclosure provides a computing apparatus including a storage circuit and a processor coupled to the storage circuit. The processor is configured to execute the following steps: capturing a current video frame displayed by an HMD in response to the HMD being worn on the head of a user, where the current video frame is generated based on an orientation position parameter of the HMD; determining a frame elevation angle of the current video frame; and calibrating the orientation position parameter of the HMD according to the frame elevation angle, such that the HMD displays a next video frame generated based on the calibrated orientation position parameter.

Based on the above, in the embodiments of the present disclosure, the current video frame displayed by the HMD is captured in response to the HMD being worn on the head of the user, and the frame elevation angle of the current video frame is determined. Then, the orientation position parameter will be calibrated based on the frame elevation angle, so that the frame angle of view of the next video frame generated according to the calibrated orientation position parameter conforms to the expectation of the user. Therefore, the frame angle of view of the video frame displayed by the HMD can be immediately and automatically calibrated in response to the user wearing the HMD, so that the experience of the user is improved.

In order to make the aforementioned and other objectives and advantages of the present disclosure comprehensible, embodiments accompanied with figures are described in detail below.

DESCRIPTION OF THE EMBODIMENTS

Some embodiments of the present disclosure will be described in detail below with reference to the accompanying drawings. For reference symbols used in the following descriptions, same reference symbols in different drawings represent same or similar components. These embodiments are merely a part of the present disclosure, and do not disclose all possible implementations of the present disclosure. More specifically, these embodiments are merely examples of a method, a system, and an apparatus in the claims of the present disclosure.

Figure 1:
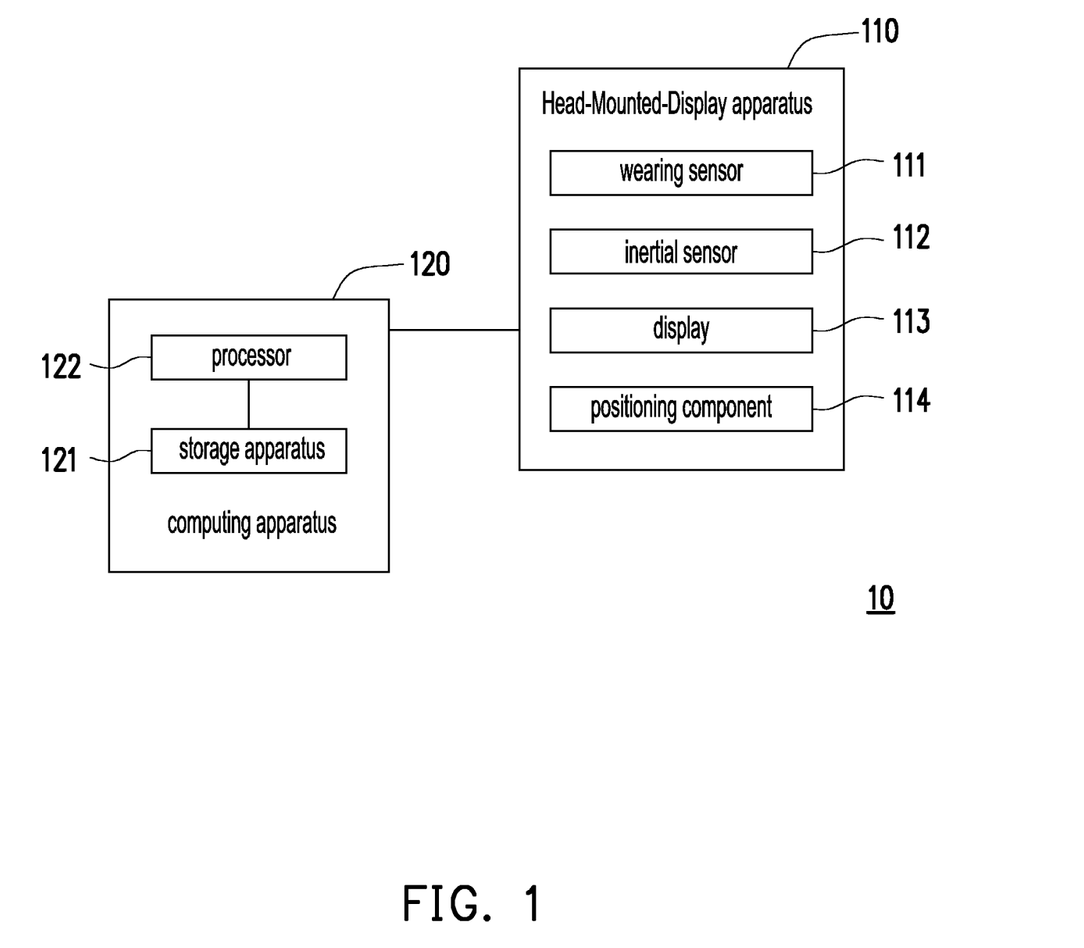
FIG. 1 is a schematic diagram of a virtual reality display system according to an embodiment of the present disclosure.

FIG. 1 is a schematic diagram of a virtual reality display system according to an embodiment of the present disclosure. However, FIG. 1 is only intended to facilitate describing the present disclosure, rather than to limit the present disclosure. Referring to FIG. 1, the virtual reality display system 10 includes an HMD 110 and a computing apparatus 120.

The computing apparatus 120 may create a true environment or a virtual scene with a stereoscopic visual effect and is also capable of communicating with the HMD 110, so that a user may search and interact in a virtual world. The computing apparatus 120 includes a storage apparatus 121 and a processor 122.

The storage apparatus 121 is used for storing data such as a virtual reality image content, a program code and a software component, and may be, for example, any type of fixed or mobile random access memory (RAM), a read-only memory (ROM), a flash memory, a hard disk or any other similar apparatus, an integrated circuit and a combination thereof.

The processor 122 is, for example, a central processing unit (CPU), or any other programmable microprocessor with a general or special purpose, a digital signal processor (DSP), a programmable controller, an application specific integrated circuit (ASIC), a programmable logic apparatus (PLD), a graphics processing unit (GPU) or other similar apparatuses, or a combination of the apparatuses. The processor 122 is capable of executing the program code, a software module, an instruction and the like recorded in the storage apparatus 121, so that an angle of view calibration method provided by an embodiment of the present disclosure is realized.

For illustration, the computing apparatus 120 may be integrated with the HMD 110 to form one apparatus, or may be wiredly or wirelessly connected with the HMD 110. In other words, the virtual reality display system 10 may be implemented by being integrated into a single head-mounted apparatus. Or the virtual reality display system 10 may be implemented by a plurality of interconnected electronic apparatuses. For example, the computing apparatus 120 may be a game machine, a notebook computer, a desktop computer or any other electronic apparatus with computing power, while the HMD 110 may be externally connected to the computing apparatus 120 by a data transmission interface.

The HMD 110 such as a VR helmet is suitable for being worn on the head of the user. The HMD 110 receives video data and audio data provided by the computing apparatus 120, so as to display and play the video data and the audio data for the user, and the user has the experience of being visually immersed in the virtual world. In the present embodiment, the HMD 110 includes a wearing sensor 111, an inertial sensor 112, a display 113 and a positioning component 114.

The wearing sensor 111 detects whether the HMD 110 is worn on the head of the user. The wearing sensor 111 may be a proximity sensor, an infrared sensor or another type of sensor, and is not limited in the present disclosure. The wearing sensor 111 may send a wearing signal to inform the processor 122 when the wearing sensor 111 detects that the user wears the HMD 110 on the head.

The inertial sensor 112 may be an acceleration sensor, a gyroscope, a magnetometer or any sensor capable of detecting a movement state of the HMD 110. Sensed data generated by the inertial sensor 112 may be used for positioning the HMD 110.

The display 113 is, for example, a liquid crystal display (LCD), a light-emitting diode (LED) display, an organic light-emitting diode (OLED) display or another type of display, and is not limited thereto in the present disclosure. The double eyes of the user may see a video frame displayed by the display 113 by virtue of a lens when the user wears the HMD 110 on the head.

The positioning component 114 may be implemented as different components based on a positioning and tracking technology used by the virtual reality display system 10. The virtual reality display system 10 may apply an outside-in tracking technology needing to depend on external equipment or an inside-out tracking technology not needing any external equipment, and is not limited in the present disclosure. If the virtual reality display system 10 applies the outside-in tracking technology to position and track the HMD 110, the positioning component 114 may be an infrared light/visible light emitter or a laser receiver or the like arranged on a surface of a shell of the HMD 110. If the virtual reality display system 10 applies the inside-out tracking technology to position and track the HMD 110, the positioning component 114 may be a color image camera, a depth camera, an infrared camera or another type of camera.

In one embodiment, position measurement data may include sensed data provided by the inertial sensor 112 and position data (such as a depth image, a laser light receiving data, an infrared light image and the like) associated with the positioning component 114. The processor 122 may track the posture of the head according to the position measurement data and an orientation position parameter to acquire a frame angle of view of the HMD 110 and capturing a frame content, requiring to be displayed by the HMD 110, from a 3D panoramic image according to the frame angle of view. In one embodiment, the processor 122 may acquire a real orientation of the HMD 110 according to the position measurement data, the real orientation being an angle (for example, the angle may include an elevation angle, a yaw angle and a roll angle) of a posture presented by the HMD 110 in a real world, and then, the frame angle of view is computed according to the real orientation and the orientation position parameter. Based on this, the virtual reality display system 10 can provide a corresponding video frame in response to an action of the head of the user, so that the user is enabled to have a feel of being visually immersed in an virtual environment.

In one embodiment, the wearing sensor 111 sends a wearing signal to inform the processor 122 when the wearing sensor 111 detects that the HMD 110 is changed from a state of not wearing on the head to a state of wearing on the head. Accordingly, the processor 122 captures a current video frame displayed by the HMD 110 in response to the HMD 110 being worn on the head of the user according to detection, and the current video frame is generated according to an uncalibrated direction position angle parameter. The processor 122 may capture the current video frame from a frame buffer, and the frame buffer is used for storing a video frame which will be displayed by the display 113. As aforesaid, the current video frame associated with the wearing signal is generated based on the orientation position parameter of the HMD 110.

In one embodiment, the processor 122 may determine a frame elevation angle of the current video frame according to the frame content of the current video frame. The processor 122 may estimate the frame elevation angle according to the image feature of the current video frame. In one embodiment, the processor 122 may input the current video frame to a machine learning model to predict the frame elevation angle of the current video frame. A machine learning algorithm of the machine learning model may be a deep learning algorithm, a neural-network-like algorithm or another machine learning algorithm, or the like, and is not limited in the present disclosure. In other words, the machine learning model or a classifier for estimating the frame elevation angle may be established in advance according to a training frame and an actual elevation angle of the training frame. The processor 122 may use the machine learning model to predict the frame elevation angle of the current video frame. For example, it is supposed that the frame elevation angle of a horizontal front frame is 90 degrees, the processor 122 may determine that the frame elevation angle of the current video frame is 100 degrees according to the image feature of the current video frame.

In one embodiment, the processor 122 calibrates the orientation position parameter of the HMD 110 according to the frame elevation angle, such that the HMD displays a next video frame generated based on the calibrated orientation position parameter. Specifically speaking, the processor 122 may compute a difference value between a frame elevation angle and a preset expected angle of view to acquire an angle of view offset, and then, regulating the orientation position parameter of the HMD 110 according to the angle of view offset. In one embodiment, the orientation position parameter may be regarded as an angle of view standard for deciding the frame angle of view, and the processor 122 decides a frame angle of view according to the angle of view standard and the position measurement data of the HMD 110. Therefore, the preset expected angle of view may be set as a horizontal angle of view under the condition that the frame angle of view preset when the HMD 110 is just worn should be a horizontal front angle of view. However, the preset expected angle of view is not limited in the present disclosure. In an example, it is supposed that the angle of view offset relative to the horizontal front angle of view is 20 degrees, the orientation position parameter will be regulated from A degrees to A+20 degrees, so that the frame angle of view of the next video frame is regulated to be the horizontal front angle of view. However, in other embodiments, the orientation position parameter may be any other parameter for deciding the frame angle of view, and any parameter capable of changing the frame angle of view may be used as the orientation position parameter in the embodiment of the present disclosure. Based on this, the HMD 110 can display the next video frame generated based on the regulated orientation position parameter, so that the frame angle of view of the next video frame of the HMD 110 conforms to the expectation of the user.

Figure 2:
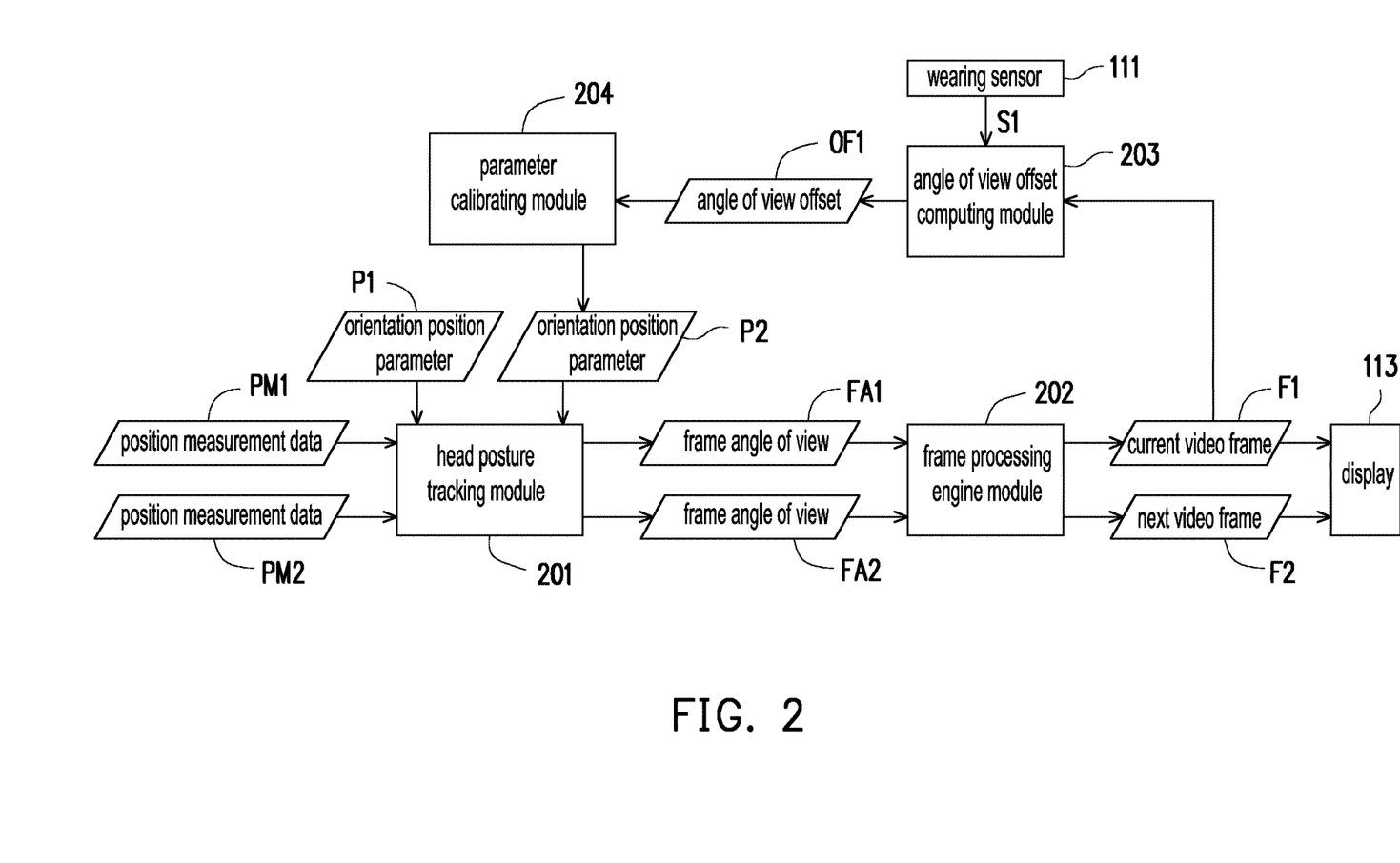
FIG. 2 is a schematic diagram of an angle of view calibration method according to an embodiment of the present disclosure.

FIG. 2 is a schematic diagram of an angle of view calibration method according to an embodiment of the present disclosure. It needs to be firstly explained that each functional module shown in FIG. 2 may be implemented by the processor 122 of the computing apparatus 120 and the software component in the storage apparatus 121. Referring to FIG. 2, a head posture tracking module 201 is capable of deciding a frame angle of view FA1 according to position measurement data PM1 and an orientation position parameter P1 corresponding to a first time point, and a frame processing engine module 202 is capable of computing a current video frame F1 according to the frame angle of view FA1 and a virtual reality content V1. The display 113 will display the current video frame F1.

An angle of view offset computing module 203 captures the current video frame F1 and determines a frame elevation angle of the current video frame F1 according to a machine learning model in response to the condition that the wearing sensor 111 detects a wearing signal S1 sent when the user wears the HMD 110. The angle of view offset computing module 203 is capable of computing an angle of view offset OF1 between the frame elevation angle and the horizontal angle of view of the current video frame F1, while a parameter calibrating module 204 is capable of regulating the orientation position parameter P1 according to the angle of view offset OF1 to generate a calibrated orientation position parameter P2. Accordingly, the head posture tracking module 201 is capable of deciding a frame angle of view FA2 according to position measurement data PM2 and the calibrated orientation position parameter P2 corresponding to a second time point, and the frame processing engine module 202 is capable of computing a next video frame F2 according to the frame angle of view FA2 and the virtual reality content V1. The display 113 will display the next video frame F2.

It needs to be explained that in an embodiment of the present disclosure, the time when the HMD 110 is just worn is used as an opportunity that the frame angle of view is regulated by calibrating the orientation position parameter, and the user may regulate the frame angle of view to be the horizontal front angle of view without executing an additional calibration procedure. In addition, in the embodiment of the present disclosure, the orientation position parameter may be further regulated to be in a more ideal state according to subsequent position measurement data after being automatically regulated according to the current video frame associated with the wearing signal.

Figure 3A:
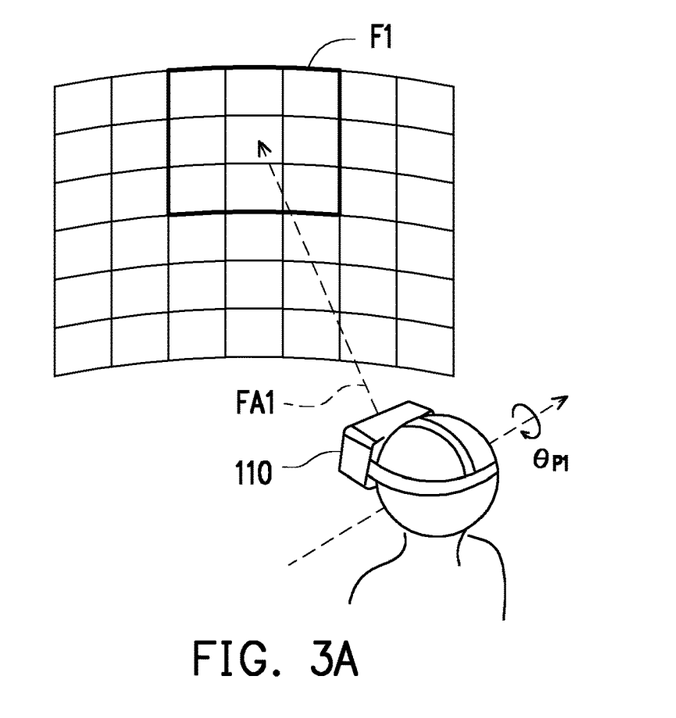
FIG. 3A and FIG. 3B are schematic diagrams of situations according to an embodiment of the present disclosure.
Figure 3B:
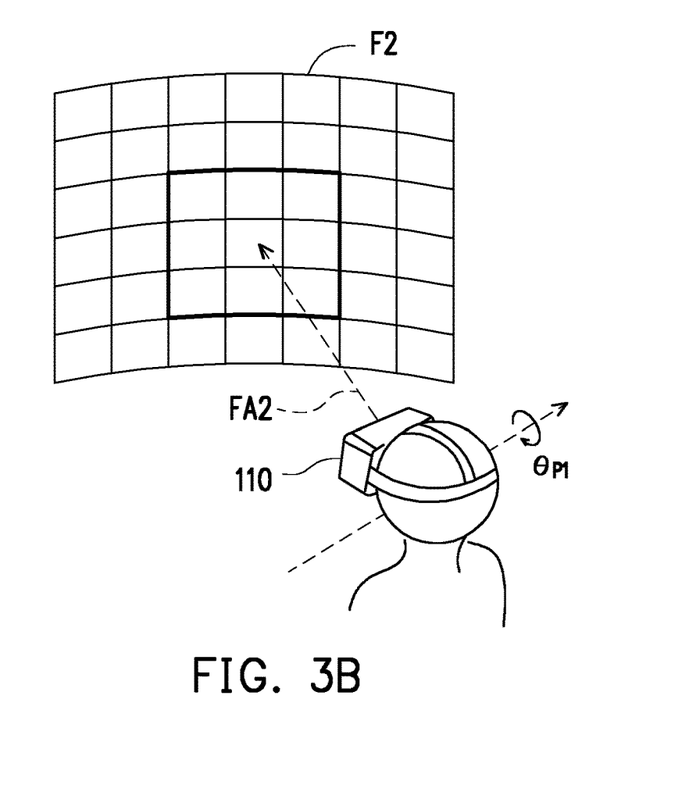

FIG. 3A and FIG. 3B are schematic diagrams of situations according to an embodiment of the present disclosure. Firstly, referring to FIG. 3A, the processor 122 may acquire a posture elevation angle $\theta_{P1}$ of the HMD 110 based on a head posture tracking technology in response to the user just wearing the HMD 110, while the posture elevation angle $\theta_{P1}$ may have an angle difference with a horizontal plane due to the posture (such as a lying posture) of the user or a position error. The processor 122 acquires the frame angle of view FA1 according to the posture elevation angle $\theta_{P1}$ and the orientation position parameter, so that the current video frame F1 is displayed according to the frame angle of view FA1. Next, the processor 122 computes the angle of view offset according to the frame elevation angle and the horizontal angle of view which are estimated based on the current video frame F1 and regulates the orientation position parameter according to the angle of view offset. Then, referring to FIG. 3B, the processor 122 acquires the frame angle of view FA2 according to the posture elevation angle $\theta_{P1}$ and the calibrated orientation position parameter, so that the next video frame F2 is displayed according to the frame angle of view FA2. Comparing FIG. 3A with FIG. 3B, the HMD 110 regulates a frame display way from a way of displaying the frame according to the frame angle of view FA1 to a way of displaying the frame according to the frame angle of view FA2 (namely the horizontal angle of view). Known from examples in FIG. 3A and FIG. 3B, in a use situation that the user wears the HMD 110 in the lying posture, the HMD 110 in the embodiments of the present disclosure may be automatically regulated to display the frame to the user according to the horizontal angle of view even if the HMD 110 is not horizontally placed.

Figure 4:
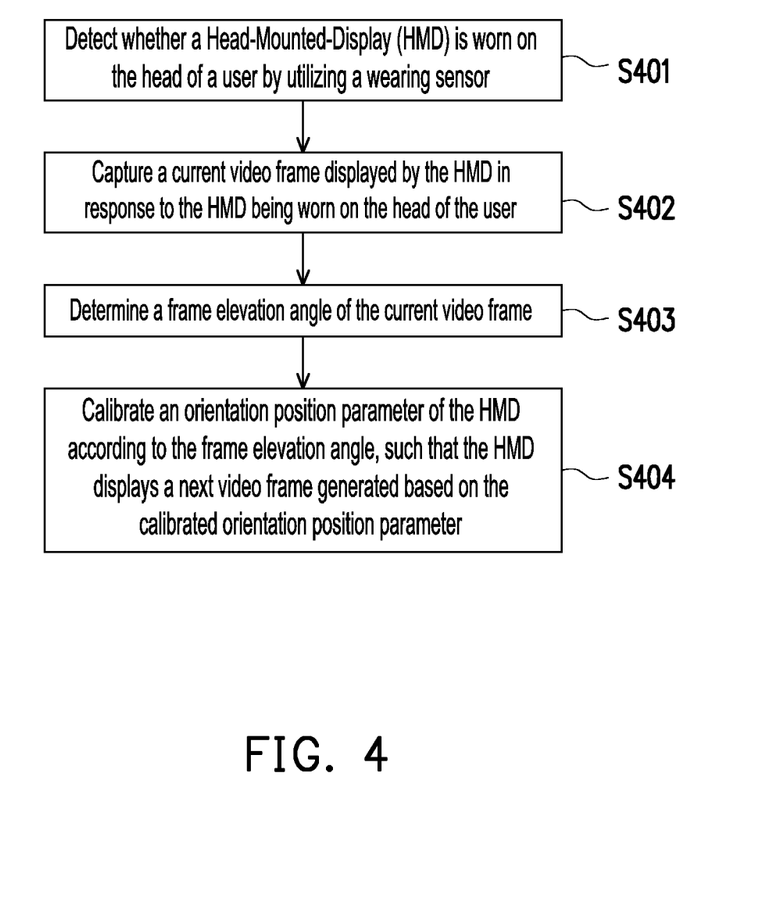
FIG. 4 is a flow diagram of an angle of view calibration method described according to an embodiment of the present disclosure.

FIG. 4 is a flow diagram of an angle of view calibration method according to an embodiment of the present disclosure. In step S401, whether an HMD is worn on the head of a user is detected by utilizing a wearing sensor. In step S402, a current video frame displayed by the HMD is captured in response to the HMD being worn on the head of the user. The current video frame is generated based on an orientation position parameter of the HMD. In step S403, a frame elevation angle of the current video frame is determined. In step S404, the orientation position parameter of the HMD is calibrated according to the frame elevation angle, such that the HMD displays a next video frame generated based on the calibrated orientation position parameter.

Figure 5:
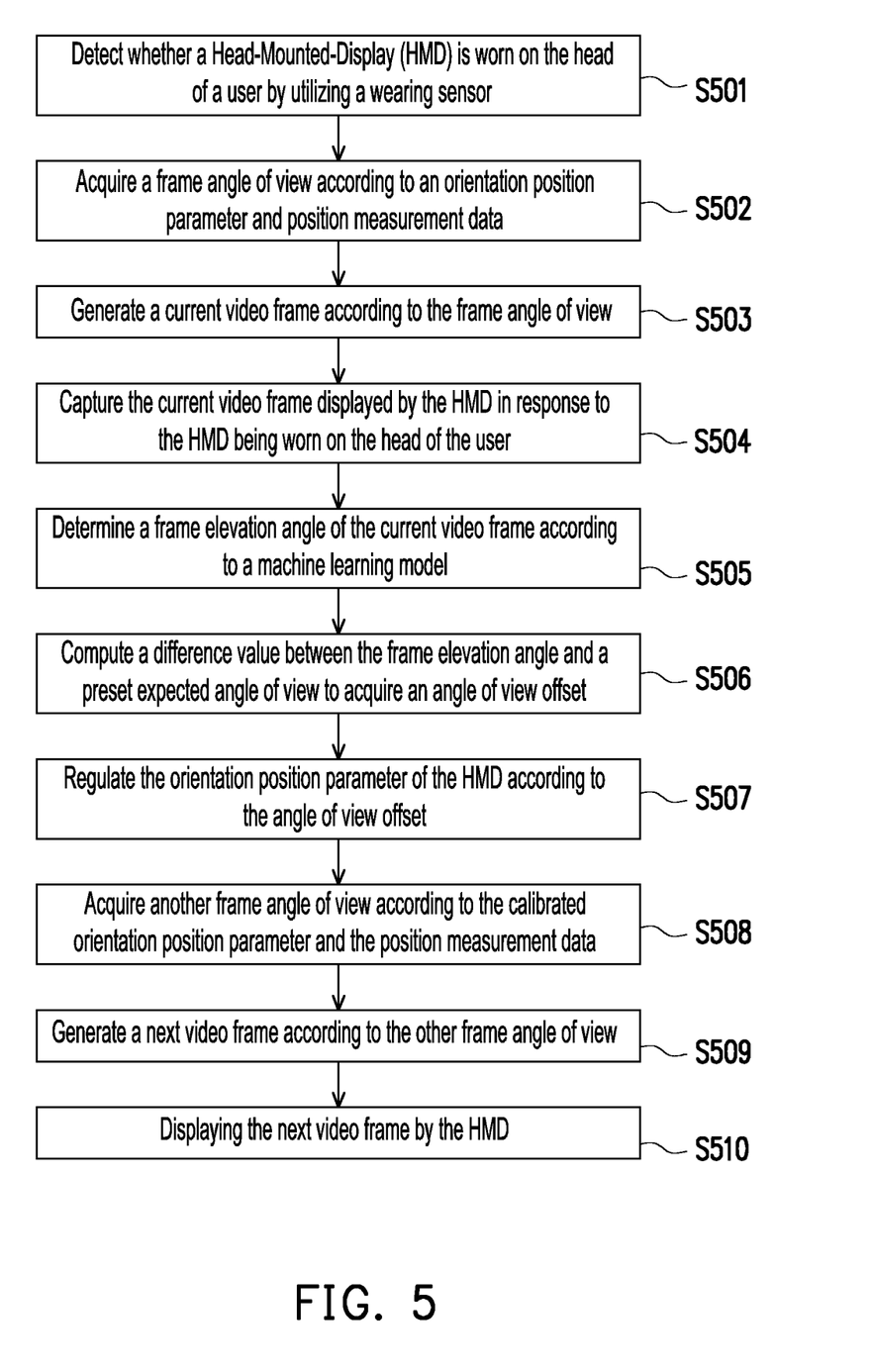
FIG. 5 is a flow diagram of an angle of view calibration method described according to an embodiment of the present disclosure.

FIG. 5 is a flow diagram of an angle of view calibration method according to an embodiment of the present disclosure. In step S501, whether an HMD is worn on the head of a user is detected by utilizing a wearing sensor. In step S502, a frame angle of view is acquired according to an orientation position parameter and position measurement data. In step S503, a current video frame is generated according to the frame angle of view. In step S504, the current video frame displayed by the HMD is captured in response to the HMD being worn on the head of the user. The current video frame is generated based on the orientation position parameter of the HMD. In step S505, a frame elevation angle of the current video frame is determined according to a machine learning model. In step S506, a difference value between the frame elevation angle and a preset expected angle of view is computed to acquire an angle of view offset. In step S507, the orientation position parameter of the HMD is regulated according to the angle of view offset. In step S508, another frame angle of view is acquired according to the calibrated orientation position parameter and the position measurement data. In step S509, a next video frame is generated according to the other frame angle of view. In step S510, the next video frame is displayed by the HMD.

However, various steps in FIG. 4 and FIG. 5 have been described as above in detail, the descriptions thereof are omitted herein. It is noteworthy that various step in FIG. 4 and FIG. 5 may be truly used as a plurality of program codes or circuits, and are not limited in the present disclosure. In addition, the methods in FIG. 4 and FIG. 5 may be matched with the embodiments to be used, or may be used alone, and are not limited in the present disclosure.

Based on the above, in the embodiments of the present disclosure, the HMD is capable of automatically providing the video frame corresponding to the preset expected angle of view to the user by estimating the frame elevation angle of the current video frame when the user wears the HMD on the head. Therefore, the user watches the video frame corresponding to the preset expected angle of view without executing the additional calibration procedure, and therefore, the convenience and the experience of the user may be greatly improved.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. An angle of view calibration method, adapted to a virtual reality display system comprising a Head-Mounted-Display (HMD), the method comprising:
    detecting whether the HMD is worn on the head of a user by utilizing a wearing sensor;
    capturing a current video frame displayed by a display of the HMD in response to an action of wearing the HMD on the head of the user, wherein the current video frame is generated based on an orientation position parameter of the HMD;
    determining a frame elevation angle of the current video frame; and
    calibrating the orientation position parameter of the HMD according to the frame elevation angle, such that the HMD displays a next video frame generated based on the calibrated orientation position parameter,
    wherein the step of determining the frame elevation angle of the current video frame comprises:
    inputting the current video frame to a machine learning model to predict the frame elevation angle of the current video frame.

2. The angle of view calibration method of claim 1, wherein the step of calibrating the orientation position parameter of the HMD according to the frame elevation angle, such that the HMD displays the next video frame generated based on the calibrated orientation position parameter comprises:
    computing a difference value between the frame elevation angle and a preset expected angle of view to acquire an angle of view offset; and
    regulating the orientation position parameter of the HMD according to the angle of view offset.

3. The angle of view calibration method of claim 1, before the step of capturing the current video frame displayed by the display of the HMD, the method further comprising:
    acquiring a frame angle of view according to the orientation position parameter and position measurement data; and
    generating the current video frame according to the frame angle of view.

4. A virtual reality display system, comprising:
    an HMD, comprising:
        a display;
        a wearing sensor, detecting whether the HMD is worn on the head of a user; and
    a computing apparatus, connected to the HMD and comprising:
        a storage circuit; and
        a processor, being coupled to the storage circuit and being configured to:
            capture a current video frame displayed by the display of the HMD in response to an action of wearing the HMD on the head of the user, wherein the current video frame is generated based on an orientation position parameter of the HMD;
            determine a frame elevation angle of the current video frame; and
            calibrate the orientation position parameter of the HMD according to the frame elevation angle, such that the HMD displays a next video frame generated based on the calibrated orientation position parameter,
    wherein the processor is further configured to:

input the current video frame to a machine learning model to predict the frame elevation angle of the current video frame.

5. The virtual reality display system of claim 4, wherein the processor is configured to:
compute a difference value between the frame elevation angle and a preset expected angle of view to acquire the angle of view offset; and
regulate the orientation position parameter of the HMD according to the angle of view offset.

6. The virtual reality display system of claim 4, wherein the processor is configured to:
acquire a frame angle of view according to the orientation position parameter and position measurement data; and
generate the current video frame according to the frame angle of view.

7. A computing apparatus, comprising:
a storage circuit; and
a processor, coupled to the storage circuit and configured to:
capture a current video frame displayed by a display of an HMD in response to an action of wearing the HMD on the head of a user, wherein the current video frame is generated based on an orientation position parameter of the HMD;
determine a frame elevation angle of the current video frame; and
calibrate the orientation position parameter of the HMD according to the frame elevation angle, such that the HMD displays a next video frame generated based on the calibrated orientation position parameter,
wherein in determining the frame elevation angle of the current video frame, the processor is configured to:
input the current video frame to a machine learning model to predict the frame elevation angle of the current video frame.

* * * * *